United States Patent
Jones

(12) 
(10) Patent No.: US 10,070,496 B2
(45) Date of Patent: Sep. 4, 2018

(54) TASK TO WALL COLOR CONTROL

(71) Applicant: MoJo Labs, Inc., Longmont, CO (US)

(72) Inventor: Morgan Jones, Longmont, CO (US)

(73) Assignee: MOJO LABS, INC., Longmont, CO (US)

(*) Notice: Subject to any disclaimer, the term of this patent is extended or adjusted under 35 U.S.C. 154(b) by 0 days.

(21) Appl. No.: 15/085,643

(22) Filed: Mar. 30, 2016

(65) Prior Publication Data

US 2016/0295659 A1 Oct. 6, 2016

Related U.S. Application Data

(60) Provisional application No. 62/139,972, filed on Mar. 30, 2015.

(51) Int. Cl.
| | | |
|---|---|---|
| *H05B 33/08* | (2006.01) | |
| *G01J 1/42* | (2006.01) | |
| *G01J 3/50* | (2006.01) | |
| *G01J 3/46* | (2006.01) | |
| *H05B 37/02* | (2006.01) | |

(52) U.S. Cl.
CPC ........ *H05B 33/0872* (2013.01); *G01J 1/4204* (2013.01); *G01J 3/462* (2013.01); *G01J 3/505* (2013.01); *H05B 37/0272* (2013.01); *H05B 37/0281* (2013.01); *G01J 2003/467* (2013.01); *H05B 37/0218* (2013.01); *Y02B 20/341* (2013.01); *Y02B 20/42* (2013.01)

(58) Field of Classification Search
CPC ............... H05B 33/0869; H05B 37/02; H05B 37/0218; H05B 37/0272
USPC .......................................... 315/149–152, 158
See application file for complete search history.

(56) References Cited

U.S. PATENT DOCUMENTS

| | | |
|---|---|---|
| 5,701,058 A | 12/1997 | Roth |
| 5,812,422 A | 9/1998 | Lyons |
| 6,340,864 B1 | 1/2002 | Wacyk |
| 6,741,351 B2 | 5/2004 | Marshall et al. |
| 7,570,246 B2 | 8/2009 | Maniam et al. |

(Continued)

OTHER PUBLICATIONS

Author: Light Emitting Diodes, Date:Dec. 2006, Publisher Second Edition 2006.*

(Continued)

*Primary Examiner* — Douglas W Owens
*Assistant Examiner* — Wei Chan
(74) *Attorney, Agent, or Firm* — Sanders IP Law

(57) ABSTRACT

A light sensor is disclosed that includes a photosensor; a memory; a communication interface; and a controller coupled with the photo sensor, the communication interface, and the memory. The controller may be configured to perform a number of operations. For example, the controller may be configured to sample from the photosensor a light intensity of light within a first spectral range at a non-task location within an architectural space; and determine a change in the first spectral range output of a light source to produce a desired amount of light within the first spectral range at a task location based on the sensed light intensity of the color channel at the non-task location. In some embodiments, the task location and the non-task locations are different locations within the architectural space. The controller may also be configured to transmit the change in the color channel output to a light source.

17 Claims, 12 Drawing Sheets

(56) References Cited

U.S. PATENT DOCUMENTS

| | | |
|---|---|---|
| 7,583,901 B2 | 9/2009 | Nakagawa et al. |
| 7,926,300 B2 | 4/2011 | Roberts et al. |
| 7,952,292 B2 | 5/2011 | Vegter et al. |
| 8,305,014 B1 | 11/2012 | Li et al. |
| 8,330,395 B2 | 12/2012 | Hoschopf |
| 8,410,706 B2 | 4/2013 | Steiner et al. |
| 8,749,145 B2 | 6/2014 | Jones |
| 8,749,146 B2 | 6/2014 | Jones |
| 8,842,009 B2 | 9/2014 | Jones |
| 9,288,882 B2 | 3/2016 | Jones |
| 2004/0085901 A1 | 5/2004 | Hooper et al. |
| 2005/0015122 A1 | 1/2005 | Mott et al. |
| 2006/0087841 A1 | 4/2006 | Chern et al. |
| 2007/0058987 A1 | 3/2007 | Suzuki |
| 2008/0203273 A1 | 8/2008 | Deurenberg |
| 2008/0284348 A1 | 11/2008 | Cortenraad |
| 2008/0309255 A1 | 12/2008 | Myers et al. |
| 2008/0310850 A1 | 12/2008 | Pederson et al. |
| 2009/0200958 A1 | 8/2009 | Doherty et al. |
| 2009/0245806 A1 | 10/2009 | Murayama et al. |
| 2009/0263132 A1 | 10/2009 | Rafel et al. |
| 2009/0323321 A1* | 12/2009 | Paolini .................. H05B 33/086 362/231 |
| 2010/0007600 A1 | 1/2010 | Deurenberg et al. |
| 2010/0045191 A1* | 2/2010 | Aendekerk ............ G05D 25/02 315/152 |
| 2010/0188004 A1 | 7/2010 | Baggen et al. |
| 2010/0244706 A1 | 9/2010 | Steiner |
| 2010/0284690 A1 | 11/2010 | Rajagopal et al. |
| 2010/0327757 A1 | 12/2010 | Chung et al. |
| 2010/0327764 A1 | 12/2010 | Knapp |
| 2011/0018465 A1 | 1/2011 | Ashdown |
| 2011/0031897 A1 | 2/2011 | Henig et al. |
| 2011/0084615 A1 | 4/2011 | Welten |
| 2011/0115386 A1 | 5/2011 | Delnoij et al. |
| 2011/0156596 A1 | 6/2011 | Salsbury |
| 2011/0199004 A1* | 8/2011 | Henig ................. H05B 37/0218 315/152 |
| 2012/0007511 A1* | 1/2012 | Choong ................. H05B 37/02 315/152 |
| 2012/0086568 A1* | 4/2012 | Scott ..................... G05B 15/02 340/501 |
| 2012/0091896 A1 | 4/2012 | Schenk et al. |
| 2012/0091903 A1 | 4/2012 | Bembridge |
| 2012/0153838 A1 | 6/2012 | Schenk et al. |
| 2012/0200226 A1 | 8/2012 | Knibbe et al. |
| 2012/0206050 A1 | 8/2012 | Spero |
| 2012/0217882 A1 | 8/2012 | Wong et al. |
| 2012/0281879 A1 | 11/2012 | Vlutters et al. |
| 2013/0069540 A1 | 3/2013 | Schenk et al. |
| 2013/0140995 A1 | 6/2013 | Jones |
| 2013/0328486 A1* | 12/2013 | Jones ..................... H05B 37/02 315/151 |
| 2013/0334971 A1* | 12/2013 | Jones ................. H05B 37/0272 315/151 |
| 2014/0225526 A1 | 8/2014 | Jonsson |
| 2014/0263977 A1 | 9/2014 | Jones |
| 2014/0268790 A1* | 9/2014 | Chobot ............... F21V 23/0464 362/276 |
| 2014/0292207 A1 | 10/2014 | Jones |
| 2015/0208490 A1* | 7/2015 | Bishop .................. G08C 17/02 315/153 |
| 2016/0014549 A1 | 1/2016 | Jones |
| 2016/0205748 A1 | 7/2016 | Lashina et al. |
| 2017/0171941 A1 | 6/2017 | Steiner |

OTHER PUBLICATIONS

U.S. Notice of Allowance in U.S. Appl. No. 13/310,911 dated Mar. 10, 2014, 10 pgs.
U.S. Non-Final Office Action in U.S. Appl. No. 13/310,911 dated Jun. 21, 2013, 22 pgs.
U.S. Final Office Action in U.S. Appl. No. 13/310,911 dated Dec. 17, 2013, 25 pgs.
U.S. Notice of Allowance in U.S. Appl. No. 13/913,157 dated May 23, 2014, 7 pgs.
U.S. Non-Final Office Action in U.S. Appl. No. 13/913,157 dated Mar. 3, 2014, 6 pgs.
U.S. Non-Final Office Action in U.S. Appl. No. 13/970,424 dated Dec. 13, 2013, 16 pgs.
U.S. Notice of Allowance in U.S. Appl. No. 14/263,527 dated Nov. 12, 2015, 9 pgs.
U.S. Final Office Action in U.S. Appl. No. 14/263,527 dated Jul. 29, 2015, 7 pgs.
U.S. Non-Final Office Action in U.S. Appl. No. 14/263,527 dated Jan. 2, 2015, 18 pgs.
U.S. Notice of Allowance in U.S. Appl. No. 13/970,424 dated Mar. 17, 2014, 8 pgs.
U.S. Non-Final Office Action in U.S. Appl. No. 15/368,317 dated May 8, 2017, 13 pgs.
U.S. Notice of Allowance in U.S. Appl. No. 15/367,317 dated Jun. 1, 2017, 8 pgs.
U.S. Final Office Action in U.S. Appl. No. 14/214,024 dated Apr. 6, 2017, 13 pgs.
U.S. Non-Final Office Action in U.S. Appl. No. 14/214,024 dated Jun. 16, 2016, 13 pgs.
U.S. Non-Final Office Action in U.S. Appl. No. 14/214,024 dated Jun. 16, 2016, 15 pgs.

* cited by examiner

TASK TO WALL COLOR CONTROL

BACKGROUND

The lighting controls industry uses the word "task" to indicate the point where the user cares about the light level. For example, the user is working at a desk; the task location is the light level at the desk. It could also be a kitchen counter, the light level at a book, or a conference table.

SUMMARY

A light sensor is disclosed that includes a photosensor; a memory; a communication interface; and a controller coupled with the photo sensor, the communication interface, and the memory. The controller may be configured to perform a number of operations. For example, the controller may be configured to sense a light intensity of light of a color channel at a non-task location within an architectural space using the photosensor; determine a change in the color channel output of a light source to produce a desired amount of light of the color channel at a task location based on the sensed light intensity of the color channel at the non-task location, wherein the task location and the non-task locations are different locations within the architectural space; and transmit the change in the color channel output to the light source via the communication interface.

Some embodiments include apparatus, systems, and/or methods that can be used to control color content (or spectral content) at task within an architectural space with a sensor located at task. Many light fixtures include light and/or color sensors that can be used for daylighting and/or color control. These controls, however, only control the daylighting and/or control at the light fixture and not at task. Light and/or control at task, for instance, may be what is important to the occupants of the architectural space. The light at task light typically a combination of both the light fixture's output as well as light from other sources such as the sun. Some embodiments include light and/or color sensors that can be placed at task to sense the spectral content of the light at task. This spectral content can be used to determine an appropriate light and/or color adjustment at the light fixture to achieve the target spectrum.

A light sensor is disclosed that includes a photosensor; a memory; a communication interface; and a controller coupled with the photo sensor, the communication interface, and the memory. The controller may be configured to perform a number of operations. For example, the controller may be configured to sample from the photosensor a first value representing an intensity of light within a first spectral range at a non-task location within an architectural space; determine a first change in a light output within the first spectral range of a light source to produce a desired amount of light within the first spectral range at a task location based on the first value; and transmit via the communication interface the first change in a light output within the first spectral range to the light source. In some embodiments, the task location and the non-task locations are different locations within the architectural space.

In some embodiments, the controller may be configured to sample from the photosensor a second value representing an intensity of light within a second spectral range at a non-task location within an architectural space; determine a second change in a light output within the second spectral range of a light source to produce a desired amount of light within the second spectral range at the task location based on the second value; and transmit via the communication interface the second change in a light output within the second spectral range to the light source.

In some embodiments, the first change in a light output within the first spectral range comprises a percentage change in the first change in a light output within the first spectral range.

In some embodiments, the memory includes a fixture contribution table, and wherein the controller references the fixture contribution table to determine the first change in a light output within the first spectral range.

In some embodiments, the controller may be further configured to determine an ambient light contribution in the first spectral range at the non-task location; determine an ambient light contribution in the first spectral range at the task location based on the ambient light contribution in the first spectral range at the non-task location; and determine the first change in a light output within the first spectral range of a light source at the task location based on the ambient light contribution in the first spectral range at the task location and values in a fixture contribution table.

In some embodiments, the controller may be further configured to determine whether a total light intensity is above a threshold.

In some embodiments, the first change in a light output within the first spectral range is determined from the following equation:

$$\text{PercentChange}_i = \text{func}(\text{desired}_i - \text{Sensor}_i * k_i - \text{TaskFC}_i + \text{WallFC} * k_i) * G_i$$

PercentChange$_i$ represents a percent change in the first spectral range output of the light source, wherein desired$_i$ represents a desired first spectral range level at the task location, wherein Sensor$_i$ represents the sampled light intensity of the first spectral range at the non-task location, wherein $k_i$ represents a non-task-to-task translation constant, wherein TaskFC$_i$ represents a fixture contribution at a given percentage of light output of a light source i the first spectral range at the task location, WallFC$_i$ represents a fixture contribution at a given percentage of light output of a light source i the first spectral range the non-task location, and wherein $G_i$ represents a predetermined gain.

Some embodiments may include a method that includes sensing a light intensity of a color channel at a non-task location within an architectural space; determining a change in a color channel output of a light source to produce a desired amount of light in the color channel at a task location based on the sensed light intensity of the color channel at the non-task location; and transmitting the change in the color channel output to the light source. In some embodiments, the task location and the non-task locations are different locations within the architectural space.

In some embodiments, the change in the color channel output comprises a percentage change in the color channel output. In some embodiments, the determining a change in the color channel output further comprises referencing a fixture contribution table.

In some embodiments, the determining a change in the color channel output further comprises: determining an ambient light contribution in the color channel at the non-task location; determining the ambient light contribution in the color channel at the task location based on the ambient light contribution in the color channel at the non-task location; and determining a change in the color channel output of the light source to achieve a desired color level at the task location based on the ambient light contribution in the color channel at the task location and values in a fixture contribution table.

In some embodiments, the method further comprises determining whether a total light intensity is above a threshold.

In some embodiments, determining a change in the color channel output further comprises determining a percentage change in the color channel output of the light source from the following equation:

$$PercentChange_i = func(desired_i - Sensor_i * k_i - TaskFC_i + WallFC * k_i) * G_i$$

$PercentChange_i$ represents a percent change in the color channel output of the light source, $desired_i$ represents a desired color channel level at the task location, $Sensor_i$ represents a sensed light intensity of the color channel at the non-task location, $k_i$ represents a non-task-to-task translation constant, $TaskFC_i$ represents a fixture contribution at a given percentage of light output of a light source i the first spectral range at the task location, $WallFC_i$ represents a fixture contribution at a given percentage of light output of a light source i the first spectral range the non-task location, and $G_i$ represents a gain for the color channel.

Some embodiments may include a method that includes sensing a light intensity of a first color channel at a non-task location within an architectural space; sensing the light intensity of a second color channel at the non-task location; sensing the light intensity of a third color channel at the non-task location; determining a change in a first color channel output of a light source to produce a desired amount of light in the first color channel at a task location based on the sensed light intensity of the first color channel at the non-task location, wherein the task location and the non-task locations are different locations within the architectural space; determining a change in a second color channel output of a light source to produce a desired amount of light in the second color channel at a task location based on the sensed light intensity of the second color channel at the non-task location; determining a change in a third color channel output of a light source to produce a desired amount of light in the third color channel at a task location based on the sensed light intensity of the third color channel at the non-task location; and transmitting the change in the first color channel output, the second color channel output, and the third color channel output to the light source.

In some embodiments, the first color channel is a green channel, the second color channel is a red channel, and the third color channel is a blue channel.

In some embodiments, the method may include sensing the light intensity of a fourth color channel at the non-task location; and determining a change in a fourth color channel output of a light source to produce a desired amount of light in the fourth color channel at a task location based on the sensed light intensity of the fourth color channel at the non-task location; and wherein the transmitting the change in the first color channel output, the second color channel output, and the third color channel output to the light source includes the change in the fourth color channel.

Some embodiments may include a method that includes sending a command to a light fixture to illuminate an architectural space with a first percentage of light within a first spectral range; detecting an amount of light within a first spectral range incident on a photosensor at a task location; storing the amount of light within the first spectral range incident on the photosensor at the task location in a fixture contribution table in conjunction with the first percentage; detecting an amount of light within the first spectral range incident on a photosensor at a non-task location; storing the amount of light within a second spectral range incident on a photosensor at the non-task location in the fixture contribution table in conjunction with the first percentage; sending a command to a light fixture to illuminate an architectural space with a second percentage of light within the first spectral range; detecting an amount of light within the first spectral range incident on a photosensor at a task location; storing the amount of light within the first spectral range incident on the photosensor at the task location in a fixture contribution table in conjunction with the second percentage; detecting an amount of light within the first spectral range incident on a photosensor at a non-task location; storing the amount of light within the second spectral range incident on a photosensor at the non-task location in the fixture contribution table in conjunction with the second percentage; sending a command to a light fixture to illuminate an architectural space with the first percentage of light within a second spectral range; detecting an amount of light within the second spectral range incident on a photosensor at a task location; storing the amount of light within the second spectral range incident on the photosensor at the task location in a fixture contribution table in conjunction with the first percentage; detecting an amount of light within the second spectral range incident on a photosensor at a non-task location; storing the amount of light within the second spectral range incident on a photosensor at the non-task location in the fixture contribution table in conjunction with the first percentage; sending a command to a light fixture to illuminate an architectural space with the second percentage of light within the second spectral range; detecting an amount of light within the second spectral range incident on a photosensor at a task location; storing the amount of light within the second spectral range incident on the photosensor at the task location in a fixture contribution table in conjunction with the second percentage; detecting an amount of light within the second spectral range incident on a photosensor at a non-task location; and storing the amount of light within the second spectral range incident on a photosensor at the non-task location in the fixture contribution table in conjunction with the second percentage.

In some embodiments, the method may also include determining a first task-to-not-task translation value from the amount of light within the first spectral range incident on a photosensor at the task location and the amount of light within the first spectral range incident on a photosensor at the non-task location for the first light percentage; determining a second task-to-not-task translation value from the amount of light within the first spectral range incident on a photosensor at the task location and the amount of light within the first spectral range incident on a photosensor at the non-task location for the second light percentage; determining a third task-to-not-task translation value from the amount of light within the second spectral range incident on a photosensor at the task location and the amount of light within the second spectral range incident on a photosensor at the non-task location for the first light percentage; determining a fourth task-to-not-task translation value from the amount of light within the second spectral range incident on a photosensor at the task location and the amount of light within the second spectral range incident on a photosensor at the non-task location for the second light percentage; and storing the first task-to-not-task translation value, the second task-to-not-task translation value, the third task-to-not-task translation value, and the fourth task-to-not-task translation value in the fixture contribution table.

These illustrative embodiments are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGS.

These and other features, aspects, and advantages of the present disclosure are better understood when the following Detailed Description is read with reference to the accompanying drawings.

DETAILED DESCRIPTION

Systems and methods are disclosed that may provide spectral control at a task location within an architectural space using light sensor readings from a non-task location. The light sensor may be configured to control the spectral and/or white light output of a light source. The amount of light produced for each of a plurality of color channels may be controlled throughout the day to ensure that the color profile of the light at a task location remains relatively constant throughout the day. The color profile at a task location will vary throughout the day as the sun passes through the sky and/or as clouds pass through the sky.

Figure 1A:
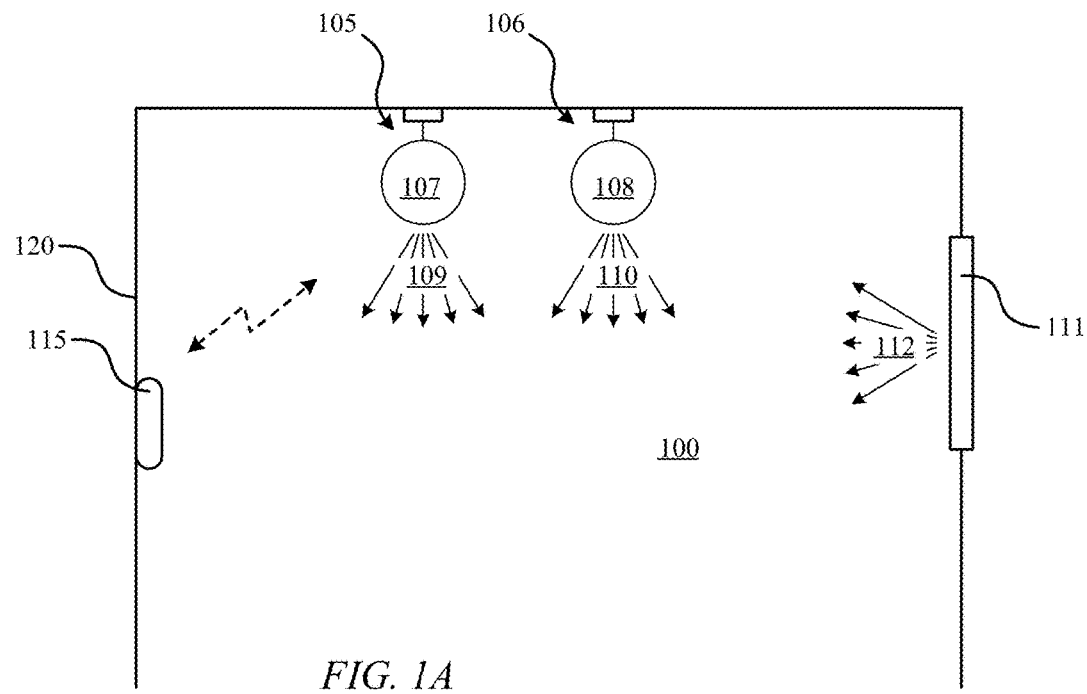
FIGS. 1A and 1B show an architectural space having a light fixture and/or a light fixture according to some embodiments described herein.
Figure 1B:
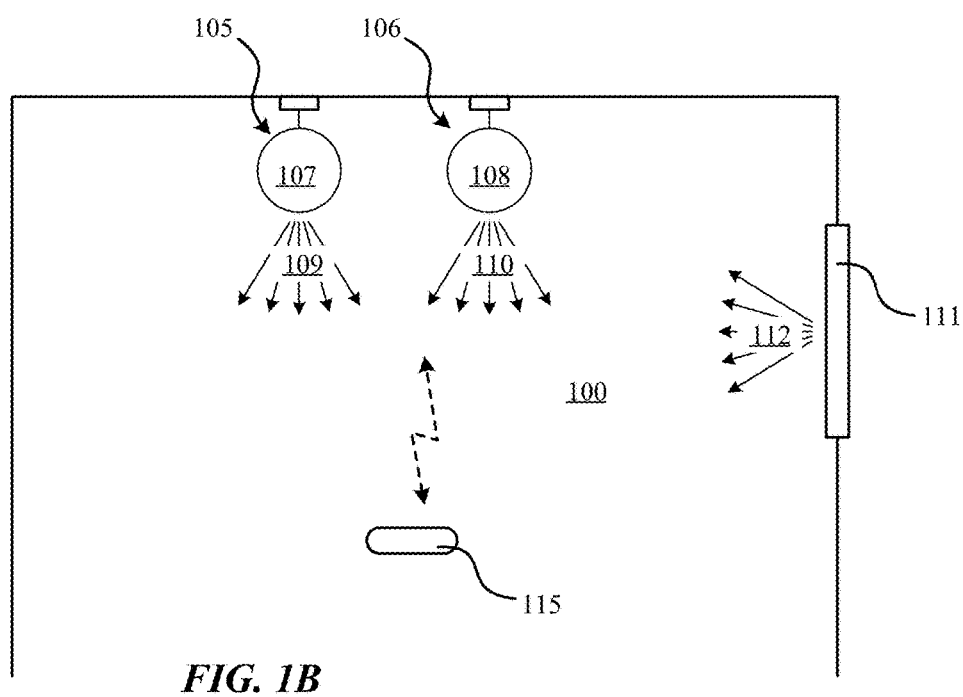

FIGS. 1A and 1B show a side view of an architectural space 100 having a light fixture 105 and/or a light fixture 106. While two light fixtures are shown, any number of light fixtures may be positioned in the architectural space 100. The light fixture 105 includes a light source 107 that produces light 109 that illuminates the architectural space 100. The light fixture 106 includes the light source 108 that produces light 110 that illuminates the architectural space 100. The light fixture 105 and/or the light fixture 106 may be secured to a wall 120 or ceiling and/or may be lamps that are positioned on a floor or a table. The light fixture 105 and/or the light fixture 106 may produce light from light-emitting diodes (LEDs), incandescent lights, or other light sources.

Figure 2:
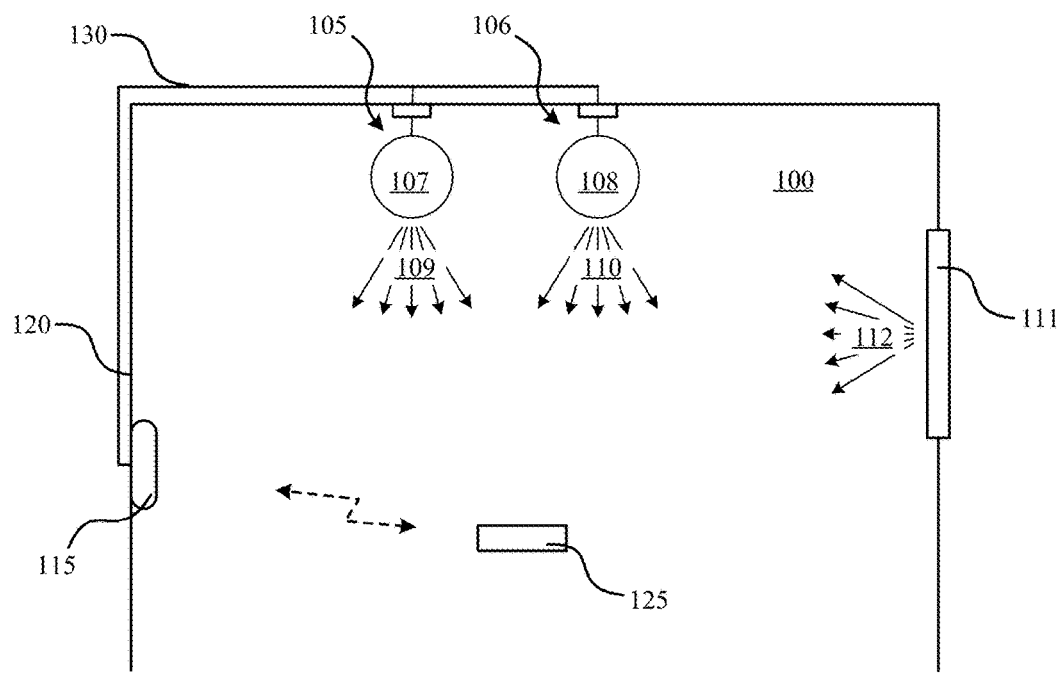
FIG. 2 shows a light sensor coupled with a wall according to some embodiments described herein.

The light fixture 105 and/or the light fixture 106 may include a number of components as shown in FIG. 2.

In some embodiments, the light fixture 105 and/or the light fixture 106 may include one or more light sources 107 or light sources 109 that may be controlled to produce light having a specific spectrum profile. For example, the light sources 107 and 109 may include one or more light sources that produce light of a specific color. For example, light source 107 may include a red light source, a blue light source, and a green light source. For example, light source 109 may include a red light source, a blue light source, and a green light source. In some embodiments, the light source 107 and/or the light source 109 may include other light sources of various colors.

A light sensor 115 may also located within the architectural space 100. The light sensor 115 may be any device that can detect lux (the luminous flux per unit area) of light in the architectural space 100. The light sensor 115 may also detect lux of light in two or more color channels such as, for example, a red channel, a green channel, a blue channel, an amber channel, etc. The light sensor 115 may be portable and may be positioned at any location within the architectural space 100. For instance, FIG. 1A shows the light sensor 115 attached to the wall 120; and FIG. 1B shows the light sensor 115 placed at a task location. The task location may be any location where the light produced by the light fixture 105 and/or the light fixture 106 may be controlled. The task location may also be any location where an individual may be working on a task such as, for example, a desk, a counter, a sink, a workbench, a machine, a chair, etc. The task location may also be any location where consistent lighting is desired.

The light sensor 115 may communicate with the light fixture 105 and/or the light fixture 106 through wireless communication such as, for example, Bluetooth, Wi-Fi, Zigbee, etc. Additionally or alternatively, in some embodiments, the light sensor 115 may be directly wired with the light fixture 105 and/or the light fixture 106 when positioned at the wall 120. In such embodiments, a portion of the light sensor 115 may be removed from its position at the wall 120 to measure light at an alternate location (e.g., at a task location), and returned to the wall 120 where the batteries may be charged and/or where the device may directly control and/or communicate with the light fixture 105 and/or the light fixture 106.

In some embodiments, the light sensor 115 may include a receptacle that is placed on the wall 120. The light sensor 115 may be moved from the task location shown in FIG. 1B to the receptacle at the wall 120 as shown in FIG. 1. The receptacle may physically hold the light sensor 115 at the wall 120 and/or be coupled with a power supply to charge the batteries within the light sensor 115.

The architectural space 100 may also include a window 111 that introduces ambient light 112 into the architectural space 100. While a single window 111 is shown, any number of windows or skylights may be included in the architectural space 100. Moreover, the architectural space 100 may include any other light source that is not a light fixture or that can be controlled from the light sensor 115 such as, for example, a television, a display, a fireplace, a lamp, etc.

Light produced within the architectural space 100 may be produced by controllable light sources (e.g., the light fixture 105 and/or the light fixture 106) and light produced from non-controllable light sources (e.g., the window 111). Light from non-controllable light sources is referred to in this document as ambient light, and light from controllable light sources is referred to in this document as fixture light. And the total light is the combination of fixture light and ambient light.

FIG. 2 shows the light sensor 115 coupled with the wall 120 according to some embodiments. An alternate mobile device 125 is also shown at a task location. The alternate mobile device 125 may include any device that can detect lux (the luminous flux per unit area) for two or more color channels and/or may communicate wirelessly with the light sensor 115 (or the light fixtures 105 and/or 106) such as, for example, a smartphone with a camera, a tablet with a camera, a dedicated auto-commissioning device that includes a photosensor and a radio, etc. The alternate mobile device 125 may measure and/or determine light levels for two or more color channels at the task location and send the light levels to the light sensor 115. Embodiments of the invention describing functionality and/or process performed by the light sensor 115 include the alternate mobile device 125 without limitation.

In some embodiments, the light sensor 115 may be a light switch (or dimmer) that is electrically coupled with the light fixture 105 and/or the light fixture 106 via a wire 130. The light sensor 115 may adjust the light output of the light fixture 105 and/or the light fixture 106 via the wire 130 using standard light switch dimming techniques. In some embodiments, the light sensor 115 may also communicate wirelessly with the light fixture 105 and/or the light fixture 106 as shown in FIGS. 1A and 1B and adjust the light output of the light fixture 105 and/or the light fixture 106. Moreover, the light sensor 115 may communicate with the alternate mobile device 125 wirelessly such as, for example, via Bluetooth, Wi-Fi, or Zigbee communication techniques.

Figure 3:
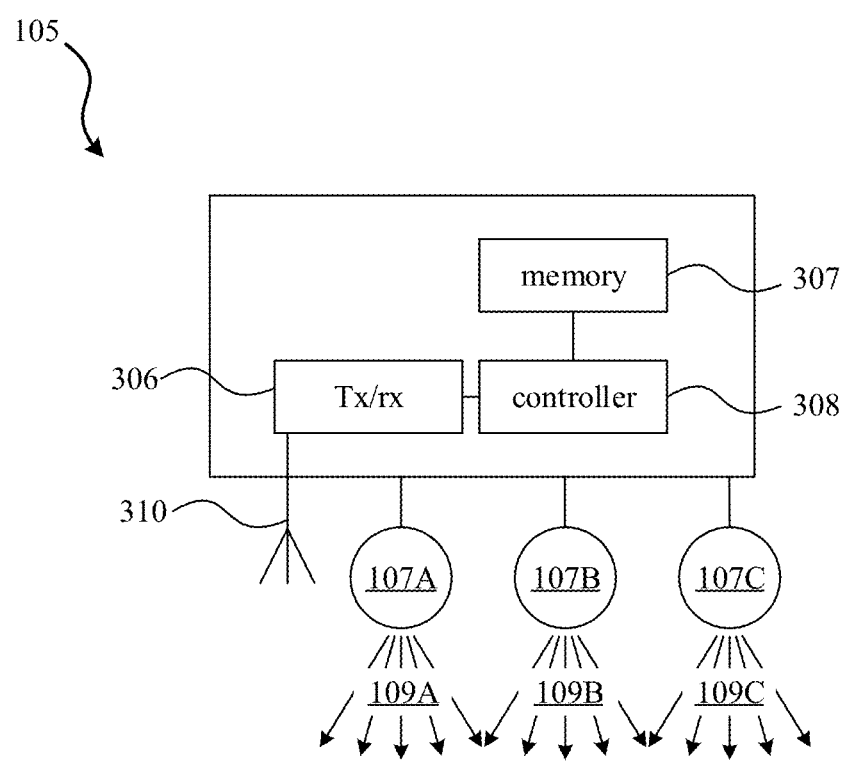
FIG. 3 illustrates a block diagram of a light fixture according to some embodiments described herein.

FIG. 3 illustrates a block diagram of the light fixture 105. The light fixture 106 may include similar blocks and/or components. The light fixture 105 can include a transceiver 306, a memory 307, a fixture controller 308, an antenna 310, a light source 107A, a light source 107B, and a light source 107C (collectively and individually light source 107), and a light source 107C. The fixture controller 308 can be communicatively coupled with the transceiver 306, the memory 307, and/or the light source 107. In some embodiments, the light fixture 105 does not include the light sensor 115, photo sensor, or photodiode.

In some embodiments, the light source 107A may produce light 109A that substantially includes light of a first color, the light source 107B may produce light 109B that substantially includes light of a first color, and the light source 107C may produce light 109C that substantially includes light of a first color.

In some embodiments, the fixture controller 308 may control the output of the light sources 107 based on communication from the light sensor 115. In some embodiments, the fixture controller 308 can be programmed, for example, with a program stored in the memory 307, to modulate the light emitted from the light source 107 to encode a burst pattern that includes a fixture identifier that is humanly imperceptible. In some embodiments, the light is modulated in response to receiving instructions from the light sensor 115 to do so through the transceiver 306 and the antenna 310. In some embodiments, the light fixture identifier can be an identifier assigned by the light sensor 115 and/or assigned by the light fixture 105 (and/or light fixture 106). For instance, in order to lower the amount of data encoded, the light sensor 115 can assign the light fixture 105 a temporary fixture identifier comprising two, three, four, five, or six bits. In some embodiments, the light fixture identifier can be uniquely set for each fixture and saved in memory.

Figure 12:
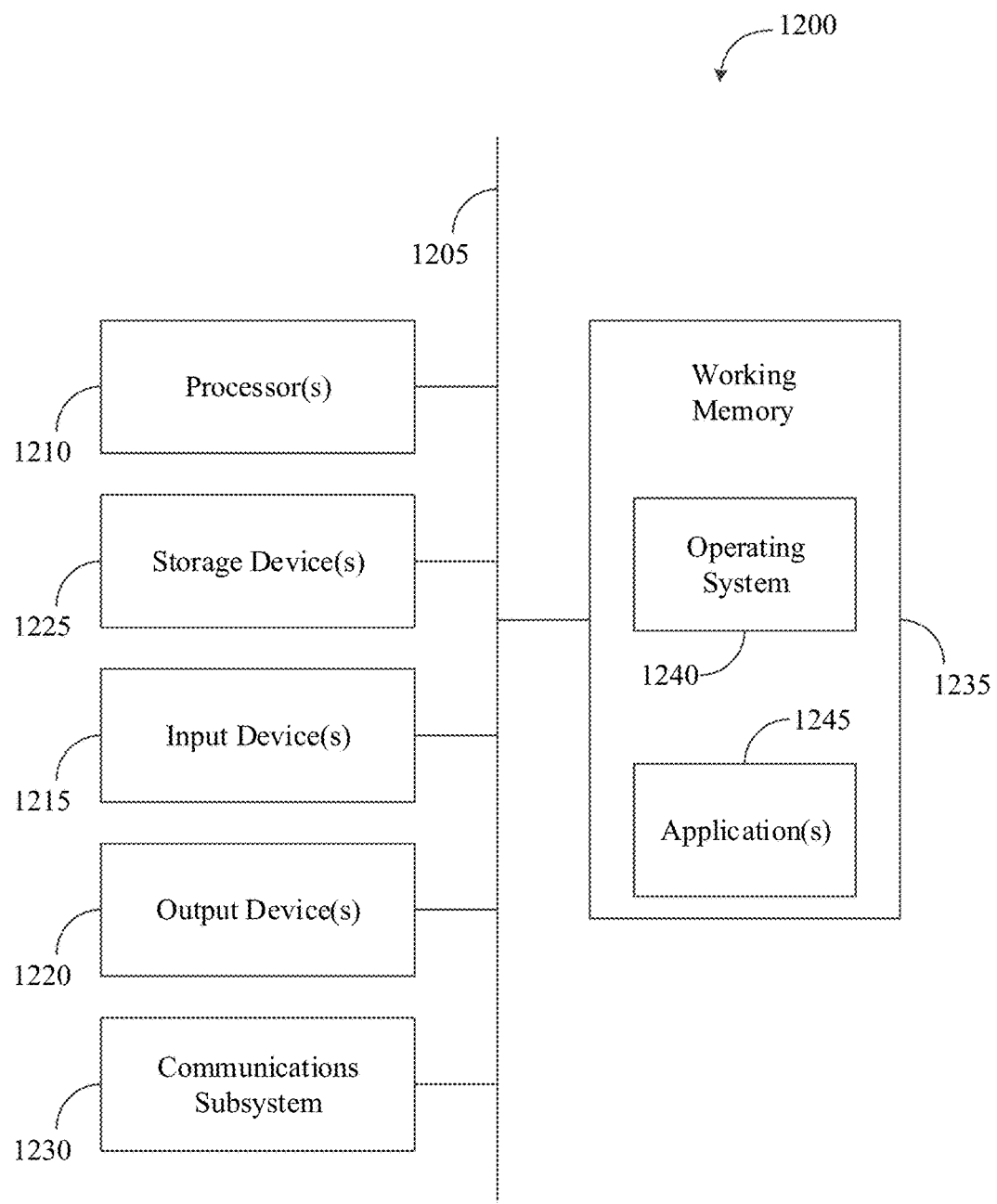
FIG. 12 shows an illustrative computational system for performing functionality to facilitate implementation of embodiments described herein.

In some embodiments, the fixture controller can include one or more components of the computational system 1200 of FIG. 12.

The burst pattern can include periods of time when the light fixture 105 emits light at a first luminance level and periods of time when the light fixture 105 emits light at a second luminance level that is less than the first luminance level. The burst pattern can include periods of time when the light fixture 105 emits light at the first luminance level and periods of time when the light fixture 105 does not emit any light. In some embodiments, the total amount of time the light source 107 illuminates light at a second luminance level over a period of 500 microseconds is less than 300, 280, 260, 240, 220, 200, 180, 160, 140, 120, 100, 80, 60, 40, or 20 microseconds give or take five microseconds.

In some embodiments, the burst pattern may include a pattern of light output that increases from 0% output to 100% light output with increments of 1, 5 or 10 percentage points. In some embodiments, the burst pattern may include a pattern of light output that decreases from 1000% output to 0% light output with increments of 1, 5 or 10 percentage points. The burst pattern may be repeated for each light source or for all the light sources at the same time.

In some embodiments, during transmission of a burst pattern the total amount of time the light source 107 illuminates light at a second luminance level over a period of about 2600 microseconds (give or take 100 microseconds) is less than 400, 380, 360, 340, 320, 300, 280, 260, 240, 220, 200, 180, 160, 140, 120, 100, 80, 60, 40, or 20 microseconds give or take five microseconds.

In some embodiments, during transmission of a burst pattern the percentage of the amount of time the light source 107 illuminates light at the second luminance level compared with the amount of time the light source 107 illuminates light at the first luminance level is less than 70%, 65%, 60%, 55%, 50%, 45%, 40%, 35%, 30%, 25%, 20%, 19%, 18%, 17%, 16%, 15%, 14%, 13%, 12%, 11%, 10%, 9%, 8%, 7%, 6%, 5%, 4%, 3%, 2.5%, 2%, 1.5%, 1%, or 0.5%.

In some embodiments, during transmission of a burst pattern the percentage of the time integral of the amount of time the light source 107 illuminates light at the first luminance level versus the second luminance level is less than 20%, 19%, 18%, 17%, 16%, 15%, 14%, 13%, 12%, 11%, 10%, 9%, 8%, 7%, 6%, 5%, 4%, 3%, 2.5%, 2%, 1.5%, 1%, or 0.5%.

In some embodiments, during transmission of a burst pattern the time integral of the periods of time when the light source 107 (e.g., light-emitting diode) emits light at a second luminance level (or the first luminance level) over a period of 500 microseconds is less than a predetermined value.

In some embodiments, during transmission of a burst pattern the time integral of the function of the luminance level over time of the light source 107 (e.g., light-emitting diode) over a period of time is less than 80%, 70%, 60%, 50%, 40%, 30%, 20%, 10%, or 5% of the greatest luminance level during the period of time times the period of time.

In some embodiments, the burst pattern is modulated using amplitude modulation, frequency modulation, phase-shift keying, frequency-shift keying, amplitude-shift keying, quadrature amplitude modulation, on-off keying, continuous phase modulation, orthogonal frequency-division modulation, wavelet modulation, trellis modulation, spread spectrum modulation, pulse width modulation, pulse position encoding, etc.

In some embodiments, the light fixture 105 can include a semiconductor switching device coupled with the light source 107 and/or the fixture controller 308. The burst pattern can be encoded by shorting or opening the semiconductor switching device to interrupt current to the light source and thus changes the illuminance from a first luminance level to a second luminance level. The semiconductor switching device can include a field-effect transistor (FET), for example, a MOSFET, JFET, etc.

The light fixture 105 can also receive an adjustment value from the light sensor 115 via the transceiver 306 and the antenna 310. In response, the fixture controller 308 can modify the illuminance of the light source 107 (e.g., light-emitting diode) based on the adjustment value. That is, the controller can increase or decrease the illuminance of the light source 107 in response to receiving the adjustment value.

Figure 4:
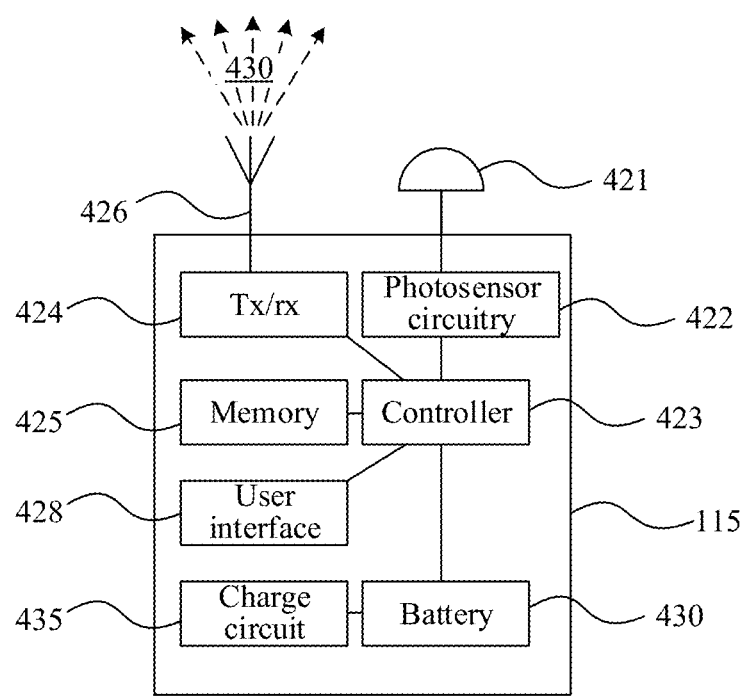
FIG. 4 illustrates a block diagram of a light sensor according to some embodiments described herein.

FIG. 4 illustrates a block diagram of the light sensor 115 according to some embodiments described herein. The light sensor 115 may include a transceiver 424, a memory 425, a light sensor controller 423, an antenna 426, a user interface 428, a battery 430, a charge circuit 435, a photosensor 421 and/or a photosensor circuitry 422. The light sensor controller 423 may be communicatively coupled with the memory 425, the transceiver 424, and/or the photosensor circuitry 422 (and/or the photosensor 421). The battery 430, for example, may be charged via the charge circuit 435 when the charge circuit is coupled with an external power source such as, for example, when the light sensor 115 is coupled with a receptacle (e.g., at the wall 120).

The photosensor 421 may include any type of photosensor that can detect the spectral range of light over the visible light range. In some embodiments, the photosensor 421 may include three photosensors that detect light in the green, red, and blue spectral ranges (or any other color channels). In some embodiments, each of the three photosensors may include a green, red, or blue filter, respectively. In some embodiments, the photosensor 421 and/or the photosensor circuitry may produce red channel data, green channel data, and blue channel data. The photosensor circuitry 422 and/or the light sensor controller 423 can determine the spectral content of the light based on the received intensity profiles received at each of the three photosensors. The photosensor 421, for example, may include a TAOS TCS3472 light sensor.

The user interface 428 may include one or more buttons, switches, dials, screens, touch screens, etc. The user interface 428 may be used to input desired light values by a user. Alternatively or additionally, the user interface 428 may be used by a user to request that the light at the current location of the light sensor 115 and/or the task location may be turned up or down. In some embodiments, the user may input values using a smartphone or other device that can communicate with the light sensor 115.

The light sensor controller 423 can be programmed, for example, with a program stored in the memory 425 (or stored on the light sensor controller), to measure the light levels (lux) of various color channels at a location (e.g., a task location or a non-task location) and store the light level in memory and/or communicate the light level to another device (e.g., a light switch, a dimmer, and/or the light fixture 105 or 106).

The light sensor controller 423 can be programmed, for example, with a program stored in the memory 425, to receive the burst pattern from the light fixture 105 through the photosensor 421 and/or the photosensor circuitry 422. The light sensor controller 423 may also associate the light fixture identifier with the light fixture. This can occur, for example, by associating the illumination light levels, spectral intensity levels, spectral light curves, light fixture identifier, temporary light fixture identifier, burst pattern, etc. in the database. The light sensor controller 423 can also send the adjustment value along with a fixture identifier to the light fixture 105 using the transceiver 424. The adjustment value can be received through a user interface, a dial, a switch, etc. In some embodiments, adjustment value and/or fixture identifiers can be broadcast to a plurality of fixtures using a table or other messaging format either singularly or as a package.

The light sensor controller 423 can receive a plurality of burst patterns from a plurality of the light fixture 105 or light sources 107. For instance, the light sensor controller 423 can receive a first burst pattern from a first light source and a second burst pattern from a second light source through the photosensor 421. The first burst pattern can include a first identifier associated with the first light source and the second burst pattern can include a second identifier associated with the second light source. The first identifier can be associated with the first light source and the second identifier can be associated with the second light source.

In some embodiments, the burst pattern may also include an illumination value that represents the illuminance or relative illuminance of the light source (e.g., a percent illumination of the light source).

In some embodiments, the light sensor controller 423 can determine the light contribution of each light fixture 105 for each of one or more color channels. The light contribution can represent the light contribution of each of the plurality of light fixtures relative to a total light level detected at the light sensor 115. In some embodiments, the light sensor controller 423 can determine adjustment value based on the light contribution of each light fixture.

Figure 5:
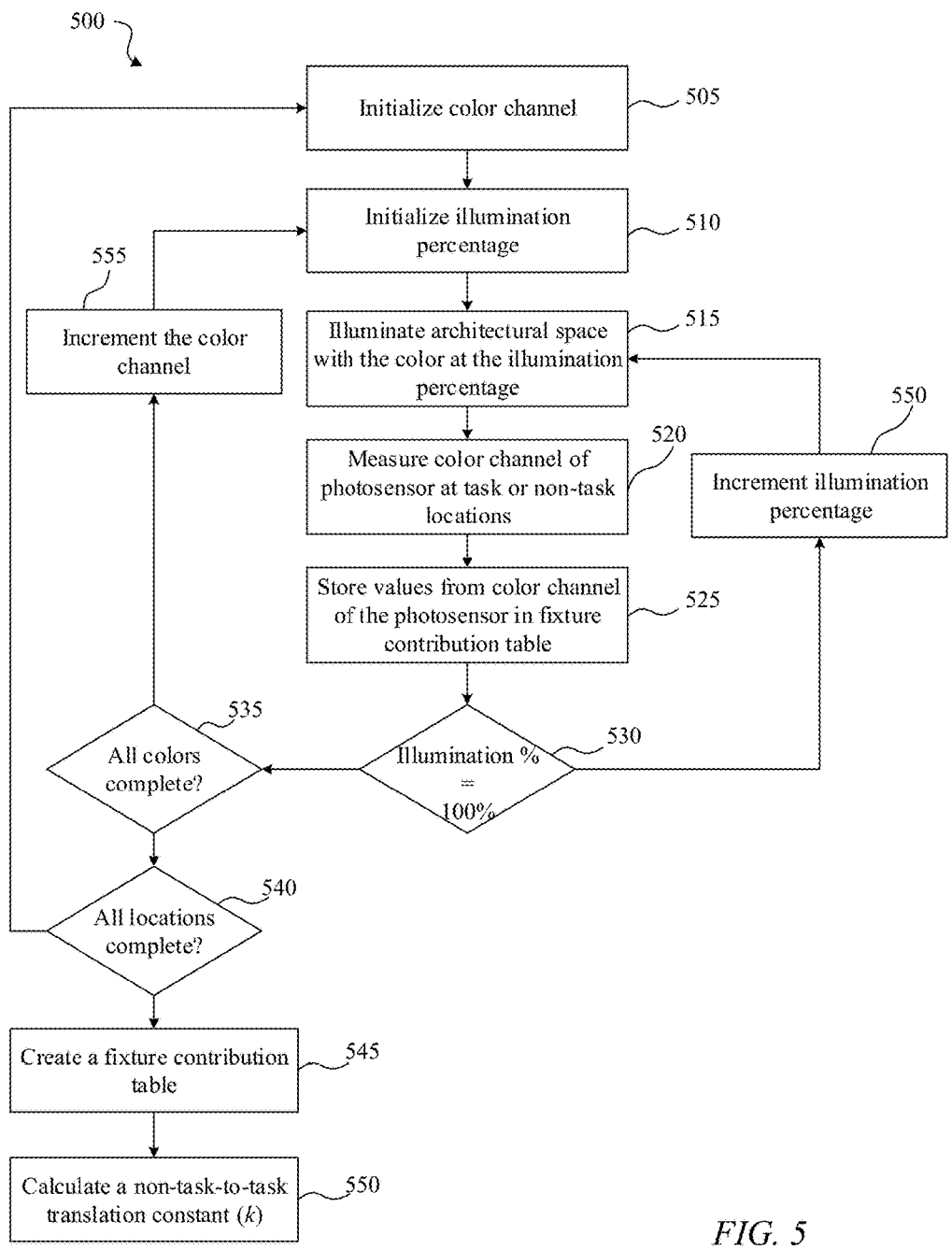
FIG. 5 is a flowchart of an example process for creating a light contribution table according to some embodiments.
Figure 6:
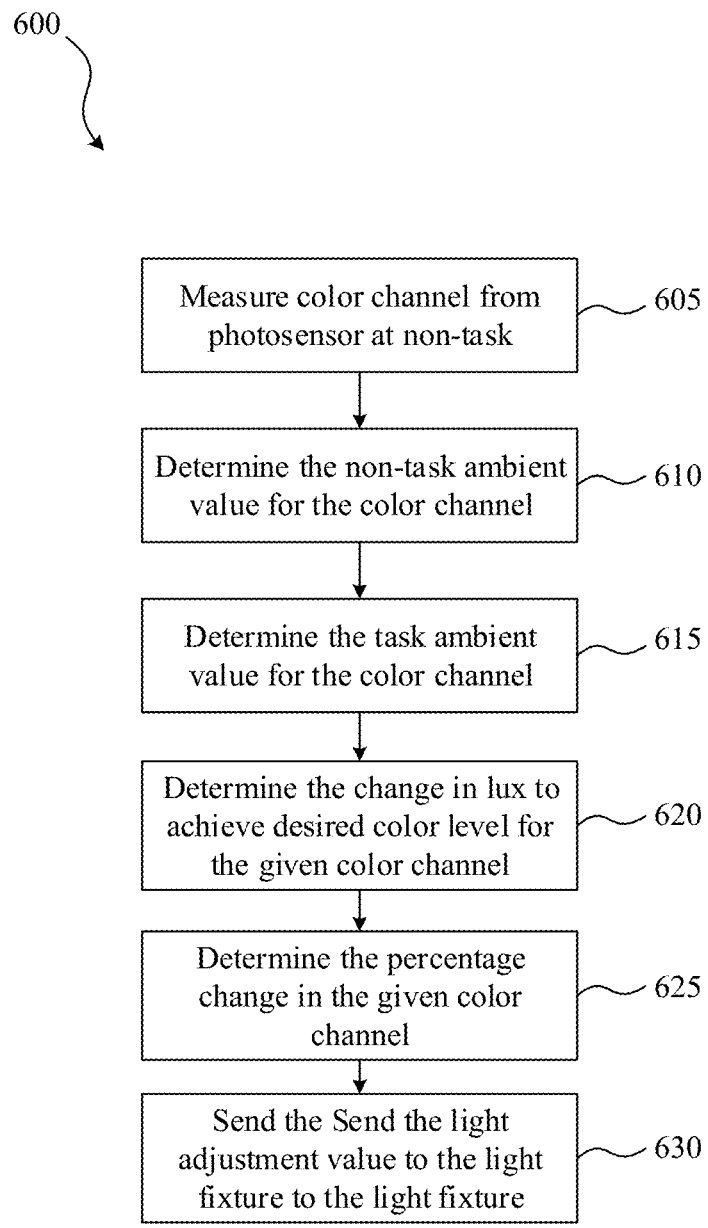
FIG. 6 is a flowchart of an example process for determining a percentage change in a color channel at a task location using light sensed at a non-task location according to some embodiments.

In some embodiments, the light sensor controller 423 can perform the processes 500 and/or 600 described in FIG. 5 and/or FIG. 6.

FIG. 5 is a flowchart of an example process 500 for creating a light contribution table using a light sensor 115. One or more steps of the process 500 may be implemented, in some embodiments, by one or more components of the light sensor 115 of FIG. 4. Although illustrated as discrete blocks, various blocks may be divided into additional blocks, combined into fewer blocks, or eliminated, depending on the desired implementation.

In some embodiments, a fixture contribution table can be constructed using process 500 that includes the contribution of a light source for each of a plurality of color channels at both a task location and a non-task location. An example fixture contribution table is provided below. This fixture contribution table, for example, includes in the first column an illumination percentage for a light source. The illumination percentage is a value that indicates the percentage of illumination between no illumination and maximum illumination of the light source. The fixture contribution table may also include illumination values recorded by a light sensor for each of a plurality of color channels at both a task location and a non-task location. The fixture contribution table may also include a non-task-to-task translation constant (k) that may be calculated as a ratio of the ambient light at the task vs. the non-task location.

| | Non-Task | | | Task | | |
|---|---|---|---|---|---|---|
| Percent | Red | Green | Blue | Red | Green | Blue |
| 0% | | | | | | |
| 10% | | | | | | |

-continued

| Percent | Non-Task | | | Task | | |
|---|---|---|---|---|---|---|
| | Red | Green | Blue | Red | Green | Blue |
| 20% | | | | | | |
| 30% | | | | | | |
| 40% | | | | | | |
| 50% | | | | | | |
| 60% | | | | | | |
| 70% | | | | | | |
| 80% | | | | | | |
| 90% | | | | | | |
| 100% | | | | | | |

Process 500 begins at block 505. At block 505, the color channel is initialized. For example, the process 500 may repeat through multiple color channels. If, for example, three color channels (e.g., red, green, and blue) are used by the light fixture, then at block 505 the first color channel may be selected, for example, red at block 505.

At block 510 the illumination percentage may be initialized. Typically, for example, the illumination percentage is initialized at 0%.

At block 515 a signal or message may be communicated to the light fixture to illuminate the architectural space with the given illumination percentage with the given color channel. For example, in the first step the light fixture may illuminate the architectural space with 0% of red light. All other color channels may be turned off.

At block 520 the photosensor may detect the amount of light of the given color channel that is incident on the photosensor at either the non-task location or at the task location. When the illumination percentage is at 0% the detected value represents the ambient light recorded by the photosensor.

At block 525 the amount of light may be recorded in the fixture contribution table in the appropriate column representing the color channel (e.g., red, green, or blue), the location (e.g., task or non-task), and in the appropriate row representing the percentage of illumination.

At block 530 it can be determined whether the illumination percentage is equal to 100% illumination. If the illumination percentage is less than 100%, then process 500 proceeds to block 550 where the illumination percentage is incremented. For example, the illumination percentage may be incremented by 1, 5, or 10 percentage points and blocks 515, 520, 525, and 530 may be repeated. If the illumination percentage is equal to 100% then process 500 may proceed to block 535.

At block 535 it can be determined whether all the color channels have been implemented. If not, then process 500 proceeds to block 555, where the color channel may be incremented. For example, if the color channel was set to red, then the color channel may be set to blue or green or any other color. If all the colors have been completed, then process 500 may proceed to block 540.

In some embodiments, blocks 535 and 555 may be removed. In addition, at block 515 the architectural space may be illuminated with all the color channels at the prescribed illumination percentage. At block 520 all the color channels may be measured at either the task location or the non-task location.

At block 540 it can be determined whether data has been collected for both the task location and the non-task location. If data has been collected for only one location, then process 500 returns to block 505 and the process 500 is repeated again for each color channel (possibly at the same time) and for each illumination percentage. In some embodiments, the user may indicate via a user interface that the light sensor is positioned at the task location and/or at the non-task location. For example, the user may press a button indicating the location of the light sensor. In some embodiments, a time delay between measuring values at the task location and the non-task location greater than a predetermined value may indicate that the calibration process may need to be repeated.

At block 545 the fixture contribution table may be created. The fixture contribution table may be created with the values recorded at block 525. In some embodiments, the fixture contribution table may include values that have the ambient values (illumination percentage at 0%) subtracted from each of the other values so that the fixture contribution table includes the fixture contribution at the task and/or the non-task location for various illumination percentages for each color channel.

At block 550 a non-task-to-task translation constant, k, may be calculated from the values in the fixture contribution table. The non-task-to-task translation constant may be calculated from the ratio of the value detected at the task location divided by the value detected at the non-task location. In some embodiments, the non-task-to-task translation constant may only be calculated for the ambient light values such as, for example, when the percentage of illumination is at 0%. In some embodiments, the non-task-to-task translation constant may be calculated for each color channel. In some embodiments, a single non-task-to-task translation constant may be calculated.

In some embodiments, white light fixture contribution values and/or a white light translation constant (k) may be included in the fixture contribution table during the process 500. In some embodiments, only white light fixture contribution values and/or white light translation constants (k) may be included in the fixture contribution table.

In some embodiments, all or portions of the process 500 may be repeated quickly. For example, the blocks 515, 520, 525, 530, and/or 550 may occur in rapid succession. For example, these blocks may repeat every 0.01, 0.05, 0.1, 0.5, 1.0, 1.5, 2.0, 10, 20, 30, 40, 50 seconds or 1, 2, 5, 10, 20, 30 minutes for each color channel. In some embodiments, blocks 505, 510, 515, 520, 525, 530, 535, 540, 555, and/or 550 can be performed in less than 0.01, 0.05, 0.1, 0.5, 1.0, 1.5, 2.0, 10, 20, 30, 40, 50 seconds or 1, 2, 5, 10, 20, 30 minutes.

FIG. 6 is a flowchart of an example process 600 for determining a percentage change in a color channel at a task location using light sensed at a non-task location. One or more steps of the process 600 may be implemented, in some embodiments, by one or more components of the light sensor 115 of FIG. 4. Although illustrated as discrete blocks, various blocks may be divided into additional blocks, combined into fewer blocks, or eliminated, depending on the desired implementation. Process 600 begins at block 605.

Process 600 presumes that the light sensor 115 knows the percentage of illumination (or any other value indicating the amount of illumination) for each color channel at the light source.

In some embodiments, at block 605 an intensity value for a given color channel may be read from a photosensor (e.g., photosensor 421 and/or photosensor circuitry 422) located at a non-task location (e.g., a wall location). The intensity value for the given color channel can be saved into memory (e.g., memory 425). The given color channel may include a first spectral range within the visual spectrum (e.g., approximately 350-750 nm) such as, for example, a blue spectral range (e.g., 350-480 nm), a red spectral range (e.g., 590-750), or a green spectral range (e.g., 480-590 nm).

At block 610 a corresponding ambient intensity value for the color channel may also be determined from the light contribution table based on the light source's illumination percentage. This is represented by the following equation, where i represents one of the color channels (e.g., red, green, or blue):

$$\text{WallAmbient}_i = \text{Sensor}_i - \text{TaskFC}_i.$$

WallAmbient$_i$ represents the ambient light value at the wall at the given time for the color channel i. Sensor$_i$ represents the spectral value recorded from the photosensor for the color channel i. And TaskFC$_i$ represents the value in the light contribution table for the color channel i for the task location and the illumination percentage used at the light source of the color channel i. The WallAmbient$_i$ represents the amount of ambient light at the non-task location.

For example, the fixture contribution table may be stored in memory (e.g., memory 425). The TaskFC$_i$ can be found from the fixture contribution table from the known percentage of illumination of the light source and the color channel. If the light source was operating at 50% for the color channel, then the table value corresponding to the given light channel and the illumination percentage may be used to determine the ambient light at the non-task location as per the equation above.

At block 615 the task ambient light intensity value can be determined based on the non-task-to-task translation constant (k) found in the light contribution table or in memory for the color channel i. This is represented by the following equation:

$$\text{TaskAmbient}_i = \text{WallAmbient}_i * k_i.$$

k$_i$ represents the task-to-task translation constant for the given color channel. For example, the value for k$_i$ can be read from the fixture contribution table in memory for the illumination percentage used at the light source of the color channel i. The task ambient light value can be saved in memory.

At block 620, the change in lux to produce the desired amount of light for the given color channel can then be calculated from the following:

$$\Delta\text{Lux}_i = \text{desired}_i - \text{Sensor}_i * k_i - \text{TaskFC}_i + \text{WallFC} * k_i.$$

$\Delta\text{Lux}_i$ represents the change in lux (or light intensity) required to produce the desired amount of light for the color channel i at the task location. desired$_i$ is the desired amount of light for the given color channel. TaskFC$_i$ represents the fixture contribution at the task location of the color channel i found in the light contribution table, and WallFC represents the fixture contribution at the non-task location of the color channel i found in the light contribution table.

The desired amount of light for the given color channel can be retrieved from memory, and/or the task fixture contribution can be retrieved from the fixture contribution table for the given color channel and for the percentage of illumination of the light source to determine the change in lux.

At block 625, the percentage change required to implement this change in the color lux can be determined from the following equation:

$$\text{PercentChange}_i = \text{func}(\Delta\text{Lux}_i) * G_i.$$

In this equation, the term G$_i$ is a gain coefficient that can be set based on how aggressive the algorithm should be in changing the light source output for a given color channel.

In some embodiments, the gain coefficient, G$_i$, can be any value that is the value one or less. The function, func( ), is a function that searches through the fixture contribution table to find the percentage of change that corresponds with the $\Delta\text{Lux}_i$ for the given color channel.

For example, the fixture contribution table stored in memory can be searched to determine the percentage change to the light fixture for the given channel based on the change in lux determined at block 620. The gain may also retrieved from memory to determine the percentage change for the given color channel.

Alternatively, the percent change can be determined from the following:

$$\text{PercentChange}_i = \text{func}(\text{desired}_i - \text{Sensor}_i * k_i - \text{TaskFC}_i + \text{WallFC} * k_i) * G_i$$

The various blocks 610, 615, 620, and/or 625 can be combined into a single calculation based on values stored in memory and/or received from the photosensor.

At block 630 the percentage change for the given color channel may be sent to the light fixture. For example, the light sensor 115 may transmit the percentage change for the given channel to the light source via the transceiver 424. In some embodiments, a message may be sent to the light source that may include information specifying the color channel, the percentage change, the light source identifier, etc. In some embodiments, portions of process 600 may be repeated for multiple color channels and the multiple percentage changes for the multiple light channels can be communicated to the light source in a single message or a single communication to the light source.

In some embodiments, process 600 may be used for white light. For instance, rather than measuring light for a given color channel, the process may determine a single white light percent change that is sent to the light source. In some embodiments, a fixture contribution table for white light may be utilized.

Figure 7:
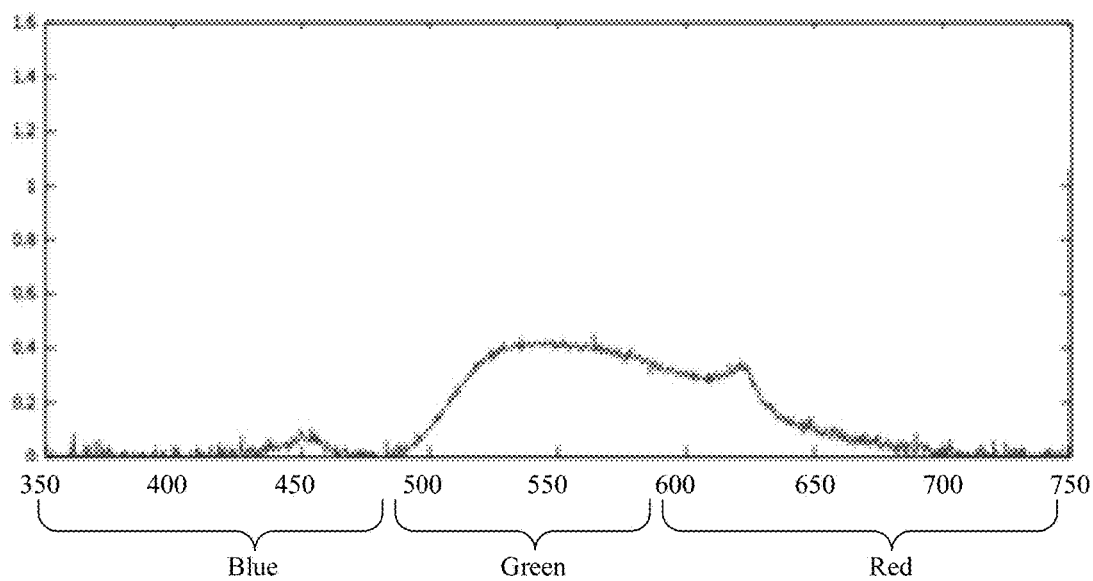
FIG. 7 is a graph showing color channel coupling.

In some embodiments, the color response of one color channel of a light source may be coupled with the color response of one or more other color channels. For example, some light fixtures may not be able to efficiently produce green light; and a phosphor converted orange LED may be used to produce green light. A phosphor converted orange LED may produce some red light as shown in FIG. 7. In some embodiments, the gain coefficient, G, may be specific to a given color channel and may be decreased to compensate for this color coupling. In some embodiments, the change valued for a light source for one or more color channels may be multiplied by a predetermined cross coupling gain factor. Alternatively or additionally, one or more channels may be adjusted more or less often to overcome color coupling.

Process 500 and/or process 600 may be used with a system having any number of color channels such as, for example, red, green, and blue color channels; or red, green, amber, and blue color channels.

In some embodiments, the overall light intensity, or white light intensity, may take priority over ensuring that a given color profile is maintained. For example, if daylight is adding significant blue to the light spectrum at the task location and the desired target spectrum shape calls for a green and red emphasis at the task location, under an intensity priority profile slight amounts of green and red may be added to the color spectrum to produce the desired light intensity. This response, therefore, produces the desired intensity profile, but does not satisfy the desired spectral profile. On the other hand, under a color priority, more green and red light may be added to produce the desired spectral profile. In some embodiments, the two regimes may be combined. For example, the spectral priority can be emphasized up to a certain total intensity level, and then intensity priority can gradually take over so that a space is not over illuminated.

Figure 8:
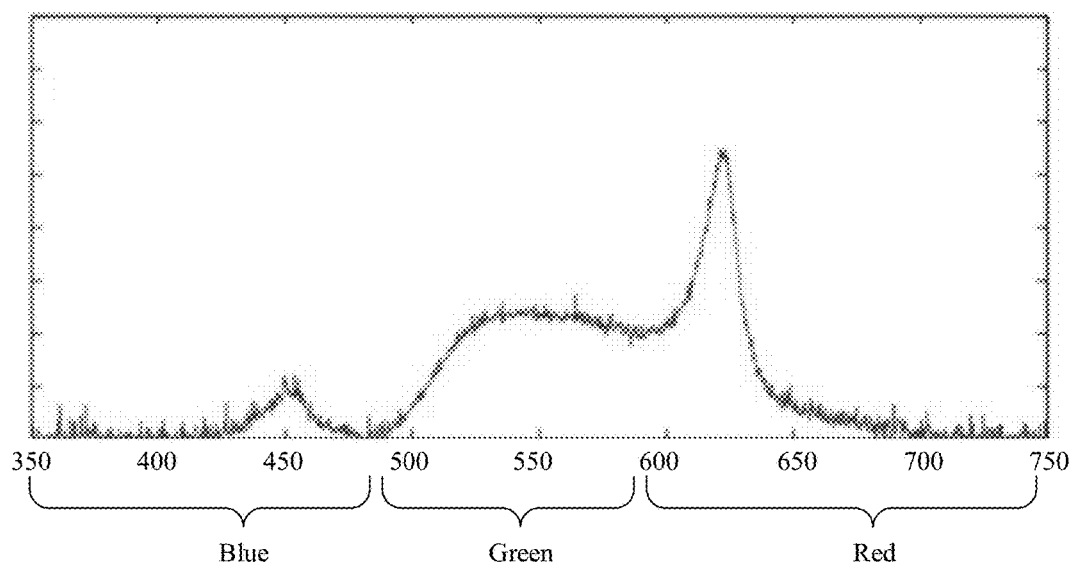
FIG. 8 is an example desired spectral vs. intensity curve for a task location.

FIG. 8 is an example desired spectral vs. intensity curve for a task location.

Figure 9:
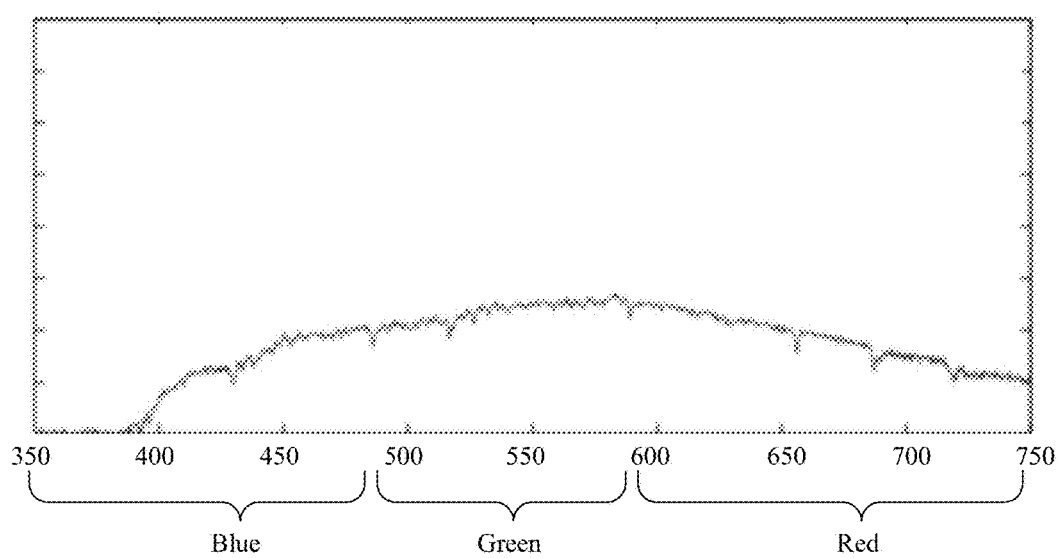
FIG. 9 is a typical spectral vs. intensity curve for sunlight.

FIG. 9 is a typical spectral vs. intensity curve for sunlight. Note that sunlight has a relatively flat spectral curve that has less blue light.

Figure 10:
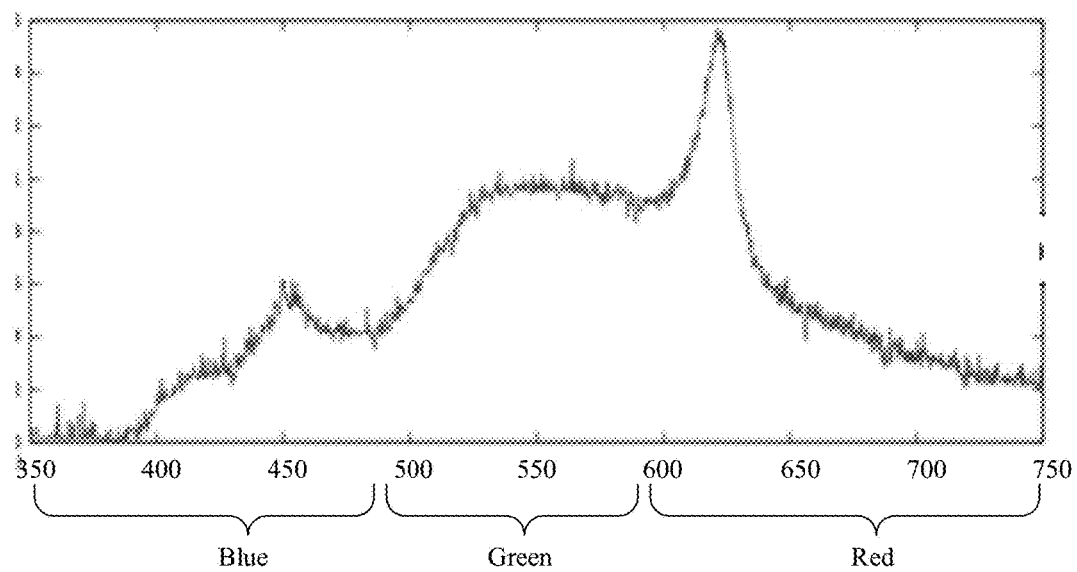
FIG. 10 is a spectral vs. intensity curve of the combination of the desired curve with the typical sunlight curve.

FIG. 10 is a spectral vs. intensity curve of the combination of the desired curve with the typical sunlight curve. This curve illustrates how light from the sun can disrupt the desired spectral vs. intensity curve if a light source only produces the desired spectral curve. In addition, if a light source only produces then the curve shown in FIG. 8 will be the spectral curve when the sun is down or when windows are closed; and the curve shown in FIG. 10 will be the spectral curve during daylight hours when sunlight is present such as, for example, through a window.

Figure 11:
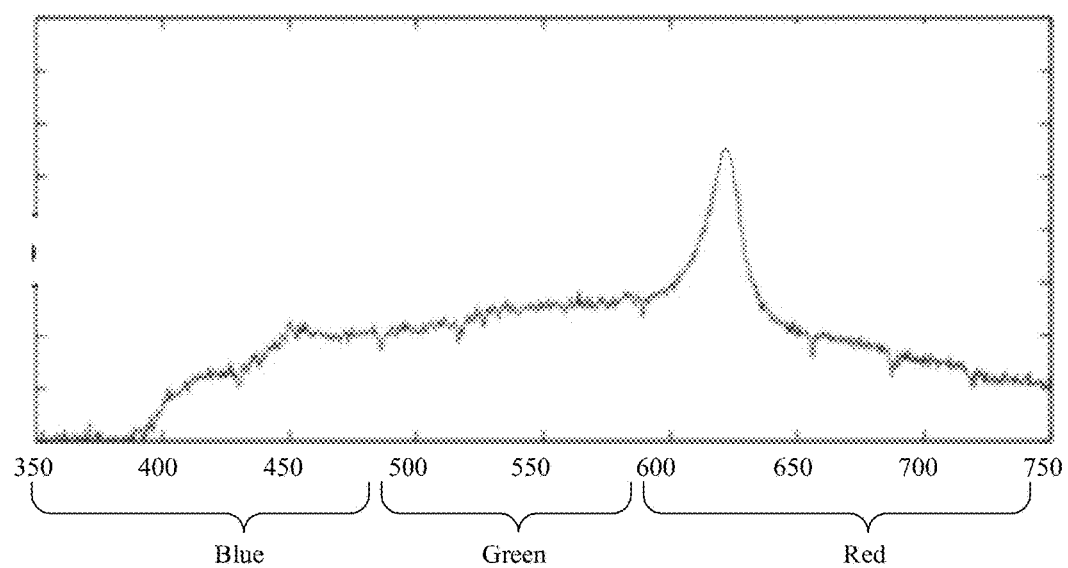
FIG. 11 is a spectral vs. intensity curve produced using embodiments of the invention.

FIG. 11 is a spectral vs. intensity curve produced using embodiments described in this document such as, for example, using process 600. In this example, the effects of the typical sunlight curve are mitigated and a spectral curve closer to the desired spectral curve is produced.

The computational system 1200 (or processing unit) illustrated in FIG. 12 can be used to perform and/or control operation of any of the embodiments described herein. For example, the computational system 1200 can be used alone or in conjunction with other components. As another example, the computational system 1200 can be used to perform any calculation, solve any equation, perform any identification, and/or make any determination described here.

The computational system 1200 may include any or all of the hardware elements shown in the FIG. and described herein. The computational system 1200 may include hardware elements that can be electrically coupled via a bus 1205 (or may otherwise be in communication, as appropriate). The hardware elements can include one or more processors 1210, including, without limitation, one or more general-purpose processors and/or one or more special-purpose processors (such as digital signal processing chips, graphics acceleration chips, and/or the like); one or more input devices 1215, which can include, without limitation, a mouse, a keyboard, and/or the like; and one or more output devices 1220, which can include, without limitation, a display device, a printer, and/or the like.

The computational system 1200 may further include (and/or be in communication with) one or more storage devices 1225, which can include, without limitation, local and/or network-accessible storage and/or can include, without limitation, a disk drive, a drive array, an optical storage device, a solid-state storage device, such as random access memory ("RAM") and/or read-only memory ("ROM"), which can be programmable, flash-updateable, and/or the like. The computational system 1200 might also include a communications subsystem 1230, which can include, without limitation, a modem, a network card (wireless or wired), an infrared communication device, a wireless communication device, and/or chipset (such as a Bluetooth® device, a 1202.6 device, a Wi-Fi device, a WiMAX device, cellular communication facilities, etc.), and/or the like. The communications subsystem 1230 may permit data to be exchanged with a network (such as the network described below, to name one example) and/or any other devices described herein. In many embodiments, the computational system 1200 will further include a working memory 1235, which can include a RAM or ROM device, as described above.

The computational system 1200 also can include software elements, shown as being currently located within the working memory 1235, including an operating system 1240 and/or other code, such as one or more application programs 1245, which may include computer programs of the invention, and/or may be designed to implement methods of the invention and/or configure systems of the invention, as described herein. For example, one or more procedures described with respect to the method(s) discussed above might be implemented as code and/or instructions executable by a computer (and/or a processor within a computer). A set of these instructions and/or codes might be stored on a computer-readable storage medium, such as the storage device(s) 1225 described above.

In some cases, the storage medium might be incorporated within the computational system 1200 or in communication with the computational system 1200. In other embodiments, the storage medium might be separate from the computational system 1200 (e.g., a removable medium, such as a compact disc, etc.), and/or provided in an installation package, such that the storage medium can be used to program a general-purpose computer with the instructions/code stored thereon. These instructions might take the form of executable code, which is executable by the computational system 1200 and/or might take the form of source and/or installable code, which, upon compilation and/or installation on the computational system 1200 (e.g., using any of a variety of generally available compilers, installation programs, compression/decompression utilities, etc.), then takes the form of executable code.

The term "substantially" means within 5% or 10% of the value referred to or within manufacturing tolerances.

Various embodiments are disclosed. The various embodiments may be partially or completely combined to produce other embodiments.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing art to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical, electronic, or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for-purposes of example rather than limitation, and does not preclude inclusion of such modifications, variations, and/or additions to the present subject matter as would be readily apparent to one of ordinary skill in the art.

That which is claimed:

1. A light sensor comprising:
    a photosensor;
    a memory;
    a communication interface; and
    a controller coupled with the photosensor, the communication interface, and the memory, wherein the controller is configured to:
        sample from the photosensor a first value representing an intensity of light within a first spectral range at a non-task location within an architectural space, wherein the first spectral range comprises a spectral range within the visual spectrum and does not include the entire visual spectrum;
        calculate a first change in a light output within the first spectral range of a light source to produce a desired amount of light within the first spectral range at a task location based on the first value, wherein the task location and the non-task locations are different locations within the architectural space;
        increase or decrease the first change in the light output within the first spectral range of the light source to ensure that the light source will produce a desired white light intensity at the task location; and
        transmit via the communication interface the first change in a light output within the first spectral range to the light source;
    wherein the first change in a light output within the first spectral range is calculated from the following equation:

$$\text{PercentChange}_i = \text{func}(\text{desired}_i - \text{Sensor}_i * k_i - \text{TaskFC}_i + \text{WallFC}_i * k_i) * G_i$$

wherein PercentChange$_i$ represents a percent change in the first spectral range output of the light source,
    wherein desired$_i$ represents a desired first spectral range level at the task location,
    wherein Sensor$_i$ represents the sampled light intensity of the first spectral range at the non-task location,
    wherein k$_i$ represents a non-task-to-task translation constant,
    wherein TaskFC$_i$ represents a fixture contribution at the task location for a given percentage of light output of the i$^{th}$ light source in the first spectral range,
    wherein WallFC$_i$ represents a fixture contribution at the non-task location for a given percentage of light output of the i$^{th}$ light source in the first spectral range; and
    wherein G$_i$ represents a predetermined gain.

2. The light sensor according to claim 1, wherein the controller is further configured to:
    sample from the photosensor a second value representing an intensity of light within a second spectral range at the non-task location within an architectural space;
    determine a second change in a light output within the second spectral range of the light source to produce a desired amount of light within the second spectral range at the task location based on the second value; and
    transmit via the communication interface the second change in a light output within the second spectral range to the light source.

3. The light sensor according to claim 1, wherein the first spectral range comprises a spectral range selected from the list consisting of a blue spectral range (350-480 nm), a red spectral range (590-750), and a green spectral range (480-590 nm).

4. The light sensor according to claim 1, wherein the first change in the light output within the first spectral range comprises a percentage change in the first change in the light output within the first spectral range.

5. The light sensor according to claim 1, wherein the memory includes the fixture contribution table, and wherein the controller references the fixture contribution table to determine the first change in the light output within the first spectral range.

6. The light sensor according to claim 1, wherein the controller is further configured to:
    determine an ambient light contribution in the first spectral range at the non-task location;
    determine an ambient light contribution in the first spectral range at the task location based on the ambient light contribution in the first spectral range at the non-task location; and determine the first change in a light output within the first spectral range of the light source at the task location based on the ambient light contribution in the first spectral range at the task location and values in the fixture contribution table.

7. The light sensor according to claim 1, wherein the controller is further configured to determine whether a total light intensity is above a threshold.

8. A method comprising:
sensing a light intensity of a color channel at a non-task location within an architectural space, wherein the color channel comprises a spectral range within the visual spectrum and does not include the entire visual spectrum;
calculating a change in the color channel output of a light source to produce a desired amount of light in the color channel at a task location based on the sensed light intensity of the color channel at the non-task location, wherein the task location and the non-task locations are different locations within the architectural space;
increasing or decreasing the change in the color channel output of the light source to ensure that the light source will produce a desired white light intensity at the task location; and
transmitting the change in the color channel output to the light source;
wherein the calculating a change in the color channel output further comprises determining a percentage change in the color channel output of the light source from the following equation:

$$\text{PercentChange}_i = \text{func}(\text{desired}_i - \text{Sensor}_i * k_i - \text{TaskFC}_i + \text{WallFC}_i * k_i) * G_i$$

wherein PercentChange$_i$ represents a percent change in the color channel output of the light source,
wherein desired$_i$ represents a desired color channel level at the task location,
wherein Sensor$_i$ represents a sensed light intensity of the color channel at the non-task location,
wherein k$_i$ represents a non-task-to-task translation constant,
wherein TaskFC$_i$ represents a fixture contribution at the task location for a given percentage of light output of the i$^{th}$ light source in the first spectral range,
wherein WallFC$_i$ represents a fixture contribution at the non-task location for a given percentage of light output of the i$^{th}$ light source in the first spectral range; and
wherein G$_i$ represents a gain for the color channel.

9. The method according to claim 8, wherein the change in the color channel output comprises a percentage change in the color channel output.

10. The method according to claim 8, wherein the determining the change in the color channel output further comprises referencing the fixture contribution table.

11. The method according to claim 8, wherein the determining a change in the color channel output further comprises:
determining an ambient light contribution in the color channel at the non-task location;
determining the ambient light contribution in the color channel at the task location based on the ambient light contribution in the color channel at the non-task location; and
determining the change in the color channel output of the light source to achieve a desired color level at the task location based on the ambient light contribution in the color channel at the task location and values in the fixture contribution table.

12. The method according to claim 8, further comprising determining whether a total light intensity is above a threshold.

13. A method comprising:
sensing a light intensity of a first color channel at a non-task location within an architectural space, wherein the first color channel comprises a spectral range within the visual spectrum and does not include the entire visual spectrum;
sensing the light intensity of a second color channel at the non-task location;
sensing the light intensity of a third color channel at the non-task location;
calculating a change in the first color channel output of a light source to produce a desired amount of light in the first color channel at a task location based on the sensed light intensity of the first color channel at the non-task location, wherein the task location and the non-task locations are different locations within the architectural space;
calculating a change in the second color channel output of the light source to produce a desired amount of light in the second color channel at the task location based on the sensed light intensity of the second color channel at the non-task location;
calculating a change in the third color channel output of the light source to produce a desired amount of light in the third color channel at the task location based on the sensed light intensity of the third color channel at the non-task location;
increasing or decreasing at least one of the change in the first color channel output of the light source, the change in the second color channel output of the light source; and the change in the third color channel output of the light source to ensure that the light source will produce a desired white light intensity at the task location; and
transmitting the change in the first color channel output, the second color channel output, and the third color channel output to the light source;
wherein the calculating a change in the color channel output further comprises determining a percentage change in the color channel output of the light source from the following equation: PercentChange$_i$=func(desired$_i$−Sensor$_i$*K$_i$−TaskFC$_i$+−WallFC*K$_i$)*G$_i$ wherein PercentChange$_i$ represents a percent change in the color channel output of the light source, wherein desired$_i$ represents a desired color channel level at the task location, wherein Sensor$_i$ represents a sensed light intensity of the color channel at the non-task location, wherein K$_i$ represents a non-task-to-task translation constant,
wherein TaskFC$_i$ represents a fixture contribution at the task location for a given percentage of light output of the i$^{th}$ light source in the first spectral range,
wherein WallFC$_i$ represents a fixture contribution at the non-task location for a given percentage of light output of the i$^{th}$ light source in the first spectral range; and
wherein G$_i$ represents a gain for the color channel.

14. The light sensor according to claim 1, wherein the first color channel comprises a spectral range selected from the list consisting of a blue spectral range (350-480 nm), a red spectral range (590-750), and a green spectral range (480-590 nm).

15. The method according to claim 13, wherein the first color channel is a green channel, the second color channel is a red channel, and the third color channel is a blue channel.

16. The method according to claim 13, further comprising: sensing the light intensity of a fourth color channel at the non-task location; and determining a change in the fourth color channel output of the light source to produce a desired amount of light in the fourth color channel at the task location based on the sensed light intensity of the fourth color channel at the non-task location; and wherein the transmitting the change in the first color channel output, the second color channel output, and the third color channel output to the light source includes the change in the fourth color channel.

17. A method comprising:
sending a command to a light fixture to illuminate an architectural space with a first percentage of light within a first spectral range;
detecting an amount of light within a first spectral range incident on a photosensor at a task location;
storing the amount of light within the first spectral range incident on the photosensor at the task location in a fixture contribution table in conjunction with the first percentage;
detecting an amount of light within the first spectral range incident on the photosensor at a non-task location;
storing the amount of light within a second spectral range incident on the photosensor at the non-task location in the fixture contribution table in conjunction with the first percentage;
sending a command to a light, fixture to illuminate an architectural space with a second percentage of light within the first spectral range, wherein the second percentage of light is different than the first percentage of light;
detecting an amount of light within the first spectral range incident on the photosensor at the task location;
storing the amount of light within the first spectral range incident on the photosensor at the task location in the fixture contribution table in conjunction with the second percentage;
detecting an amount of light within the first spectral range incident on the photosensor at the non-task location;
storing the amount of light within the second spectral range incident on the photosensor at the non-task location in the fixture contribution table in conjunction with the second percentage;
sending a command to a light fixture to illuminate an architectural space with the first percentage of light within a second spectral range;
detecting an amount of light within the second spectral range incident on the photosensor at the task location;
storing the amount of light within the second spectral range incident on the photosensor at the task location in the fixture contribution table in conjunction with the first percentage;
detecting an amount of light within the second spectral range incident on the photosensor at the non-task location;
storing the amount of light within the second spectral range incident on the photosensor at the non-task location in the fixture contribution table in conjunction with the first percentage;
sending a command to a light, fixture to illuminate an architectural space with the second percentage of light within the second spectral range;
detecting an amount of light within the second spectral range incident on the photosensor at the task location;
storing the amount of light within the second spectral range incident on the photosensor at the task location in the fixture contribution table in conjunction with the second percentage;
detecting an amount of light within the second spectral range incident on the photosensor at the non-task location; and
storing the amount of light within the second spectral range incident on the photosensor at the non-task location in the fixture contribution table in conjunction with the second percentage;
wherein the first spectral range comprises a spectral range within of the visual spectrum, the second spectral range comprises a spectral range that is a different spectral range within the visual spectrum than the first spectral range, the third spectral range comprises a spectral range that is a different spectral range within the visual spectrum than the first spectral range and the second spectral range;
wherein the first spectral range does not include the entire visual spectrum;
wherein the second spectral range does not include the entire visual spectrum; and
wherein the third spectral range does not include the entire visual spectrum;
calculating a first task-to-not-task translation value from the amount of light within the first spectral range incident on the photosensor at the task location and the amount of light within the first spectral range incident on the photosensor at the non-task location for the first light percentage;
calculating a second task-to-not-task translation value from the amount of light within the first spectral range incident on the photosensor at the task location and the amount of light within the first spectral range incident on the photosensor at the non-task location for the second light percentage;
calculating a third task-to-not-task translation value from the amount of light within the second spectral range incident on the photosensor at the task location and the amount of light within the second spectral range incident on the photosensor at the non-task location for the first light percentage;
calculating a fourth task-to-not-task translation value from the amount of light within the second spectral range incident on the photosensor at the task location and the amount of light within the second spectral range incident on the photosensor at the non-task location for the second light percentage; and
storing the first task-to-not-task translation value, the second task-to-not-task translation value, the third task-to-not-task translation value, and the fourth task-to-not-task translation value in the fixture contribution table.

\* \* \* \* \*